J. M. McCLELLAN.
WIRE-FENCE.

No. 169,365.

Patented Nov. 2, 1875.

Witnesses:
A. P. Grant.
J. E. Shaw.

Inventor:
James M. McClellan
by John A. Biedersheim
Att'y.

UNITED STATES PATENT OFFICE.

JAMES M. McCLELLAN, OF PHILADELPHIA, PENNSYLVANIA.

IMPROVEMENT IN WIRE FENCES.

Specification forming part of Letters Patent No. 169,365, dated November 2, 1875; application filed July 24, 1875.

*To all whom it may concern:*

Be it known that I, JAMES M. MCCLELLAN, of the city and county of Philadelphia, and State of Pennsylvania, have invented a new and useful Improvement in Fences, Trellises, Arbors, &c.; and I do hereby declare the following to be a clear and exact description of the nature thereof, sufficient to enable others skilled in the art to which my invention appertains to fully understand, make, and use the same, reference being had to the accompanying drawings, making part of this specification, in which—

Figure 1:
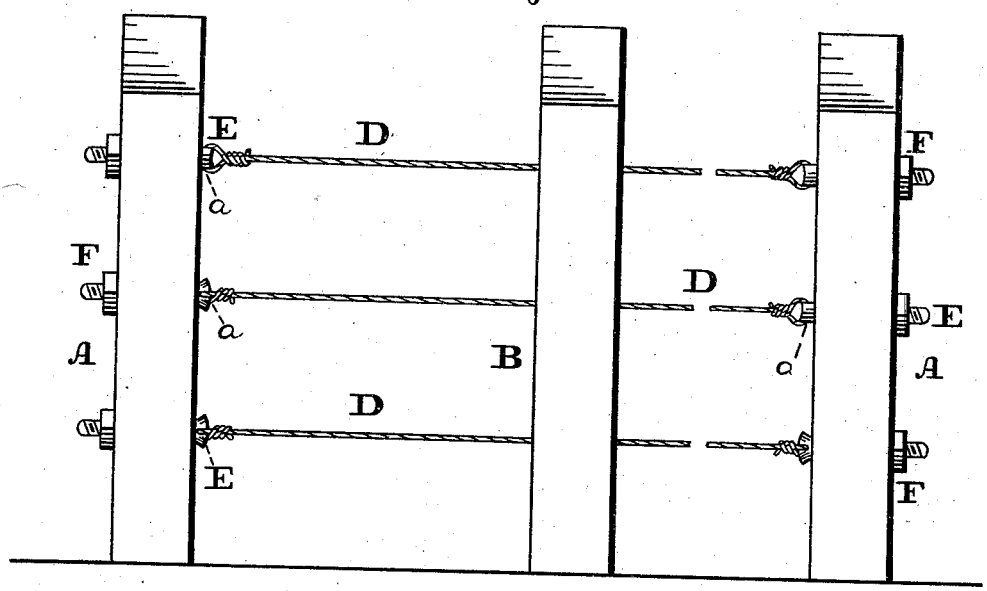
Figure 2:
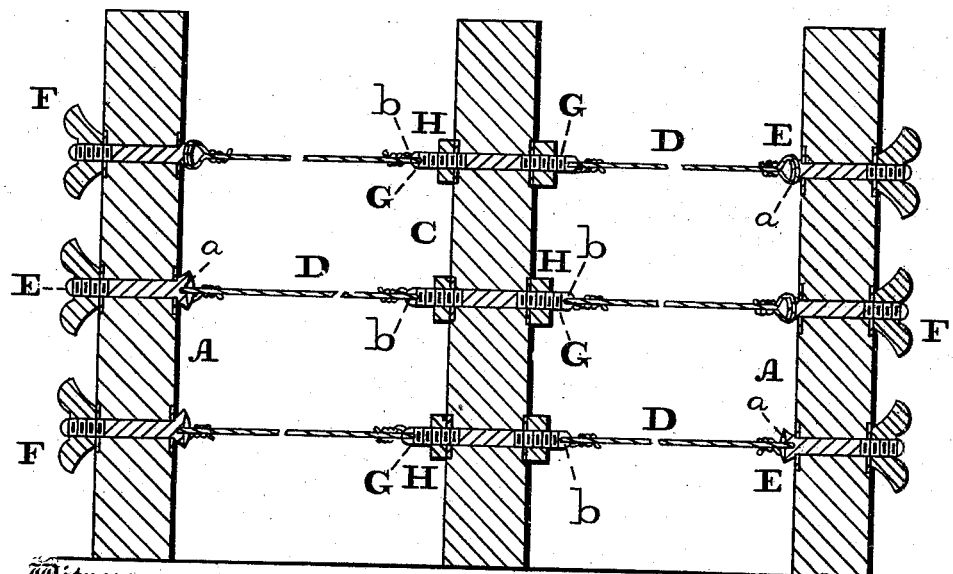

Figure 1 is a face view of the device embodying my invention. Fig. 2 is a longitudinal vertical section thereof.

Similar letters of reference indicate corresponding parts in the two figures.

My invention consists of a wire fence, which is firmly held and prevented from sagging intermediate of its ends. The wires are attached to perforated screw-bolts fitted on the end posts, and connected to screw-bolts which are threaded and perforated at both ends, and fitted on the intermediate posts, the operation of parts being hereinafter more fully set forth.

Referring to the drawings, A represents the end posts; B, the adjacent posts, and C the intermediate posts. D represents a series of wires, which are stretched from the posts A, and passed through the posts B, and their ends are connected to screw-bolts E, which are fitted in the end posts A, and prevented from disengagement therefrom by nuts F, which, screwing on the ends of the bolts, bear against said posts A. The heads of the bolts E face each other or occupy positions on the inner sides of the posts, and in said heads there are openings $a$, through which the ends of the wires are passed, which ends are then twisted or otherwise secured, so that the wires and bolts, and consequently the posts, are thereby firmly connected.

It will be seen that where the wires are to be tightened the nuts or bolts are rotated, so as to move or draw the bolts farther into the posts A, whereby the heads of the bolts recede from each other, and the wires, following their motions, are thus stretched and tightened.

Owing to the length of the wires the portions intermediate of the end posts may sag or bow, and in order to prevent this I apply to the intermediate posts C bolts G, which are threaded at both ends, and receive nuts H thereon. The ends of the bolts are also perforated or pierced, as at $b$, so that the wires D may be secured to said ends.

It is evident that by screwing the bolts G or nuts H in the proper direction the slack or sag of the wire may be taken up in both directions, so that the tautness of the wires may be maintained regardless of the length of said wires. The nuts H will retain the bolts G in the posts C, and prevent loosening or disengagement thereof.

It will be noticed that by my invention the wires may be easily tightened at both ends, and in the lengths intermediate of the ends, and the several features presented are simple and inexpensive in their natures.

Having thus described my invention, what I claim as new, and desire to secure by Letters Patent, is—

The longitudinally-arranged screw-bolts E, with perforated heads, the longitudinally-arranged screw-bolts G, with perforated ends, the nuts F H, and wires D, combined and operating substantially as and for the purpose set forth.

JAMES M. McCLELLAN.

Witnesses:
JACOB SMITH,
CHAS. H. LUNGREN.